A. H. HOYT.
ELECTRIC MEASURING INSTRUMENT.
APPLICATION FILED OCT. 18, 1907.
940,318.
Patented Nov. 16, 1909.
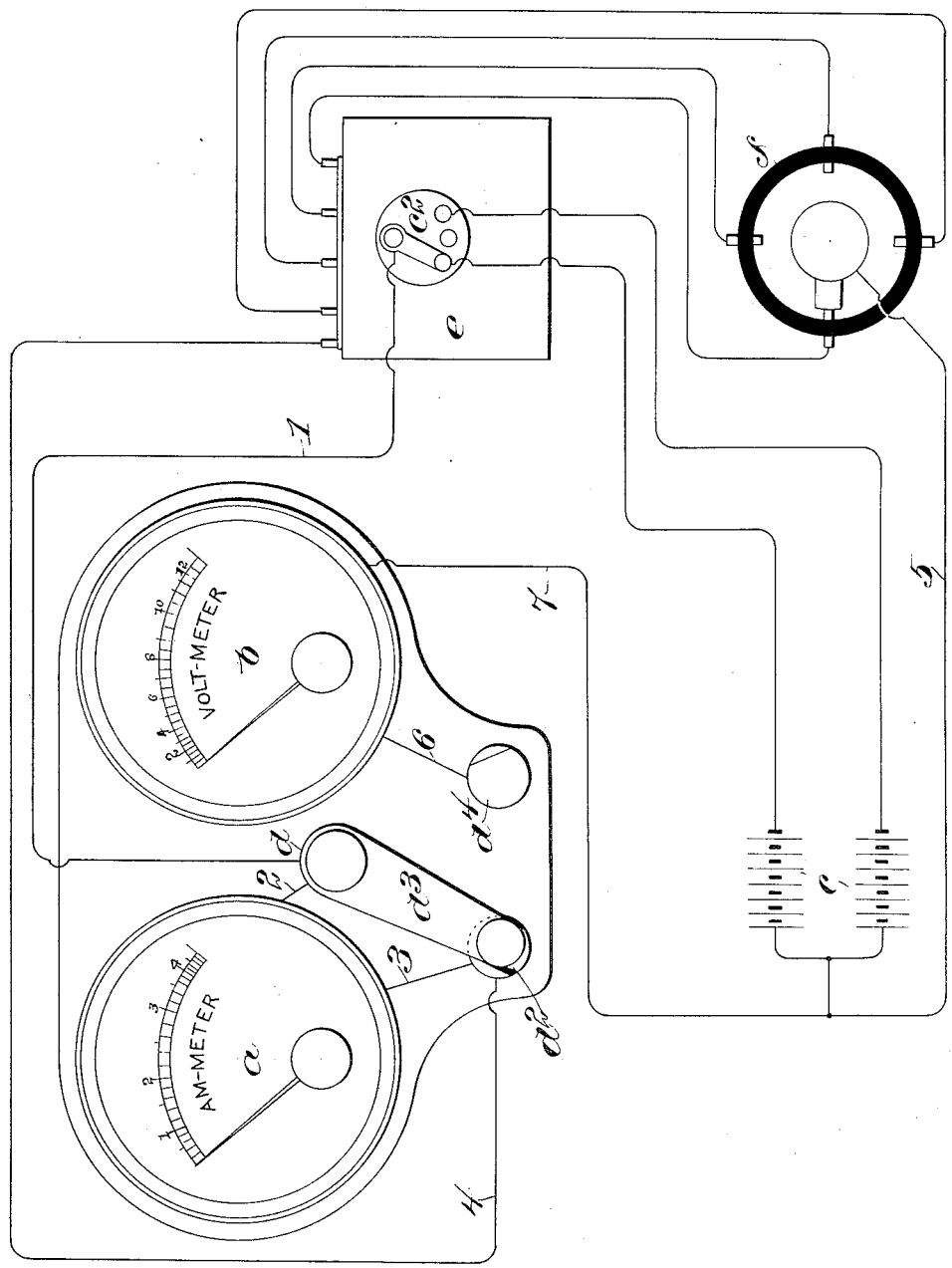

UNITED STATES PATENT OFFICE.

ADRIAN H. HOYT, OF PENACOOK, NEW HAMPSHIRE.

ELECTRIC MEASURING INSTRUMENT.

940,318.  Specification of Letters Patent.  Patented Nov. 16, 1909.

Application filed October 18, 1907. Serial No. 397,964.

*To all whom it may concern:*

Be it known that I, ADRIAN H. HOYT, a citizen of the United States, residing in Penacook, in the county of Merrimack and State of New Hampshire, have invented an Improvement in Electric Measuring Instruments, of which the following description, in connection with the accompanying drawings, is a specification, like characters on the drawings representing like parts.

The present invention relates to an electric measuring instrument and is embodied in an instrument for measuring amperage and voltage, being especially intended for use in measuring the current used in ignition systems for explosive engines.

The instrument is especially useful for automobiles, and may be arranged for attachment to the dash-board with the ammeter and voltmeter dials in view, and a controlling switch connected with the instrument.

The invention relates mainly to the wiring, the instruments themselves being of any suitable or usual construction, the purpose of the invention being to arrange the circuits so that the amperage or the voltage, or both, can be read while the current is being used.

In accordance with the invention, the ammeter is in circuit with the primary coils of the vibrator, while the voltmeter is directly connected in series with the battery or other source of current, the switch being so arranged as to short circuit the ammeter when in its normal position, and to open the short circuit and close the circuit through the voltmeter in another position, there being an intermediate position in which the ammeter alone is active.

The drawing is a diagram of the primary circuits of an ignition system with the instrument included therein.

In accordance with the invention, the ammeter $a$ and voltmeter $b$, which may be of any suitable or usual construction, are permanently connected in circuits from the batteries $c$, there being two batteries shown, and arranged to be selectively used through the agency of a switch $c^2$ in accordance with the system usually employed in automobile use.

The ammeter is in a circuit in series with the primary coils of the vibrator, the conductor 1 leading from the switch $c^2$ to a switch post $d$ from which conductors 2 and 3 lead into and out of the ammeter, the conductor 3 being connected with a switch contact $d^2$ which, in turn, is connected by means of a conductor 4 with the primary coils of the vibrator $e$. The said primary coils are connected through the timer $f$ in the usual way with the negative end of the battery $c$, a conductor 5 being herein shown to complete the circuit.

The switch member $d$ is provided with a switch handle $d^3$ which is arranged to connect the conductor 1 with the conductor 4, or with a conductor 6 which leads from the switch member $d^4$ into the voltmeter, and thence through a conductor 7 to the negative terminal of the battery $c$.

The normal position of the switch member $d^3$, as shown in full lines, is in contact with the contact piece $d^2$, so that a closed circuit of low resistance through the conductors 1 and 4 will short circuit the ammeter, so that no current is taken thereby. If it is desired to read the amperage of the current being used, this short circuit is broken by moving the switch member $d^3$ out of contact with the contact piece $d^2$, the ammeter thus being in the circuit previously traced through the primary coils and timer. This gives the current reading, while the machine is in operation, and shows how much current is being drawn through the primary coils. In this way it is not only useful in observing the amount of current available at any time during the operation of the machine, but is also available in adjusting the coils, since by turning the engine to bring the successive timer contacts into engagement, the amount of current drawn through each coil may be measured and the coil adjusted accordingly. In order to ascertain the voltage, the voltmeter may be also brought into circuit by moving the switch member $d^3$ into contact with the contact piece $d^4$ which also closes the direct circuit from the battery through the switch $c^2$ and the voltmeter. The arrangement of circuits, moreover, is such that the two meter coils can be conveniently arranged upon a common standard and mounted in any convenient position as, for example, on the dash board of an automobile, and the desired readings can be taken at any time, by manipulating the switch which is accessible from the driver's seat.

Claim.

In an electric measuring device, the combination with a source of current; of an ammeter and a voltmeter mounted on a standard common to both; a circuit leading from said source of current through said ammeter; a low resistance switch arm connected with said circuit between the source of current and the ammeter; a switch terminal adapted to be bridged by said switch arm, said switch terminal being connected with the source of current to form a shunt circuit around the ammeter when the switch arm is in contact therewith; and a conductor leading from the source of current through the voltmeter and terminating in a switch contact adapted to be engaged by the switch member aforesaid, to complete a circuit through the voltmeter.

In testimony whereof, I have signed my name to this specification in the presence of two subscribing witnesses.

ADRIAN H. HOYT.

Witnesses:
  HORACE B. SHERBURNE,
  ELIZA J. SHERBURNE.